United States Patent [19]

Mallow

[11] 4,221,597

[45] Sep. 9, 1980

[54] ADDITIVE FOR IMPROVED PERFORMANCE OF SILICATE CEMENT

[75] Inventor: William A. Mallow, San Antonio, Tex.

[73] Assignee: Pullman Incorporated, Chicago, Ill.

[21] Appl. No.: 29,097

[22] Filed: Apr. 11, 1979

[51] Int. Cl.² .......................... C09D 1/02; C09D 1/04
[52] U.S. Cl. .......................................... 106/74; 100/84
[58] Field of Search ..................................... 106/74, 84

[56] References Cited

U.S. PATENT DOCUMENTS

| 3,758,316 | 9/1973 | Sowards | 106/84 |
| 4,030,939 | 6/1977 | Mallow | 106/84 |
| 4,056,937 | 11/1977 | Suzuki | 106/74 |

*Primary Examiner*—James Poer
*Attorney, Agent, or Firm*—Stephen D. Geimer

[57] ABSTRACT

A silicate cement composition consisting of a spray dried hydrated sodium silicate powder and a silica polymer-forming agent includes an adhesive agent in the form of urea and sodium acetate which exhibits optimum adhesion to glass, metal, ceramics, wood and portland cement.

25 Claims, No Drawings

ADDITIVE FOR IMPROVED PERFORMANCE OF SILICATE CEMENT

BACKGROUND OF THE INVENTION

1. Field of the Invention

The invention pertains to silicate cements of the type disclosed in my U.S. Pat. No. 4,030,939 patented June 21, 1977.

2. Description of the Prior Art

Silicate cements containing measurable concentration of sodium in reactive form have been shown to be attacked by sulfate ion with the formation of Glauber's salt—an expansive, disruptive formation. Prior Art reports the effectiveness of various phosphate salts as inhibitors of this formation. This invention extends that art with the addition of a discovery that urea and sodium acetate surpass in performance the behavior of sodium and potassium pyrophosphates, sodium and potassium tripolyphosphates, sodium and potassium hypophosphites, and the metaphosphates. Sodium acetate and urea have been found to combine superior adhesive properties, low permeability, moisture retention (humectant) properties and superior sulfate ion resistance compared to the phosphates.

In general, the silicate cements of this invention exhibit optimum adhesion to glass, metal, ceramics, wood and portland concrete. However, they can also be induced to exhibit affinity for organic and plastic surfaces by modification with sodium tripolyphosphate. This salt at low concentrations (1-2%) will convert the adhesive properties from polar affinity to nonpolar affinity. With this phosphate, the cement surprisingly exhibits adhesion to plastics and organics such as asphalt, rubber, polyvinyl chloride, and the polyolefins. This phenomena is amenable to control such that the cement, by judicious addition of this phosphate, can be made to bond to metals and minerals or to plastics and organics or to both in varied degree. As the adhesion to metals and minerals is increased, the adhesion to plastics and organics is diminished and vice versa.

Most acid-resistant silicate cements employed in grouting, guniting, or similar applications require several hours of curing history to achieve a load bearing or rigid state. Thixotropic agents are therefore required to assure retention of coatings with no slump or drainage. Prior art has offered various clays, cellulosic and polysacchride additives such as starches, alginates, and similar colloidal additives to impart desired rheological qualities. This invention extends this practice to include or substitute for the above such chemically rather than physically active agents as to induce a controlled, early degree of viscosity increase by the generation of thickening agents in-situ by conversion of a portion of the alkali metal silicate to such a thickener. Surprisingly, tribasic magnesium phosphate added at 0.25 to 2.5 pph, basis dry solids mixture of cement ingredients, will react at even very low temperatures (32° F.) to produce a silicate salt of magnesium in hydrous, colloidal form such that a thixotropic slurry forms within 5 minutes of addition of water to the powder. Within 10 minutes, a firm gel state is attained, and within 30 minutes a compressive strength of 100–1000 psi is achieved, depending upon temperature and concentration of the magnesium phosphate. This stabilization of the coating can be very useful in applications where vibration or impact by workers and equipment may be imminent. Conventional thixotropic agents such as the bentonites, clays, and organic colloids may be added or omitted by option of the user but are only necessary when the water to solids ratios are uncontrollably higher than optimum, as with certain types of guniting equipment.

SUMMARY OF THE INVENTION

This invention discloses a spectrum of additives which at 1-5% by weight level of application may drastically and permanently alter and modify the physical and chemical properties of the silicate cement. Prior art has established the efficacy of sodium pyrophosphate ($Na_5P_3O_{10}$), sodium orthophosphate ($Na_3PO_4$), and sodium hexametaphosphate ($NaPO_3)_6$ in combination with sodium silicofluoride to produce strong sulfate-resistant, silica-based cements (U.S. Pat. Nos. 3,138,471; 3,490,931; 4,030,939) when applied to sodium silicate formulations. This invention identifies sodium tripolyphosphate as an agent to effect adhesion of silicte cements, specifically those described in U.S. Pat. No. 4,030,939, to plastics, rubber, and bitumens while sacrificing adhesion to minerals and metals.

In addition, this invention discloses the use of sodium acetate, hydrated or anhydrous, at about 1.25 to 2.0% by weight, basis the anhydrous salt, to impart improved adhesion to mineral and metal surfaces such that the adhesive bond exceeds the tensile strength of the cement matrix (usually 650 psi).

In addition, the introduction of sodium acetate inhibits sulfate ion attack on cement at temperatures from freezing to over 100° C. At higher temperatures (over 175° C.) the acetate decomposes slowly and since Glauber's salt cannot exist at such temperatures, sulfate attack is not a problem. For applications at 300° F. or below, sodium acetate alone or in combination with the phosphates will assure optimum adhesion to metals, protection of the metals from sulfuric acid penetration, and excellent adhesion to all mineral surfaces. If the surface is organic, sodium tripolyphosphate may be used alone to impart adhesion and sulfate protection. The tripolyphosphate is not recommended to be used alone on metal and mineral surfaces, due to its inhibiting effect on adhesion, but is offered as an adhesive agent for coupling silicate cements with plastic and organic substrates and to offer added protection against attack by sulfate ion.

For high temperatures (over 175° C.) sodium hypophosphite has been found to function ideally for sulfate ion and general protection to metal and mineral substrates. Applied at concentrations of 1.5 to 2% by weight of the cement, optimum adhesion and sulfate ion protection are achieved at temperatures from 0° C. to well over 300° C. and at concentrations of sulfuric acid to over 50% by weight. Beyond that concentration and at elevated temperatures (100° C.), sulfate ion attack is of no concern since Glauber's salt is dehydrated at 100° C. and higher, posing no threat to the cement structure.

Sodium acetate in hydrate or anhydrous form is pyrolized at temperatures above 175° C., but at these temperatures, sulfate ion attack does not prevail.

Sodium fluoride fixation or mineralizing agents used in the cement described in U.S. Pat. No. 4,030,939 greatly minimize the availability and lability of sodium to reaction with cementious binder at elevated temperatures by converting these soluble salts to less reactive compounds.

It is therefore the purpose of this invention to provide a method of manufacturing a cement capable of adhesion to inorganic or organic surfaces in excess of either the tensile strength of the cement or the substrate.

A further objective of this invention is to widen the spectrum of application of cements described in U.S. Pat. No. 4,030,939, to include adhesive bonding and protection to both organic and inorganic substrates at a wide range of environmental temperatures and under a wide variety of chemical exposures.

A further objective of this invention is to provide a cement which retains an optimum level of moisture to assure more complete cure when applied in thin sections or under otherwise drying conditions such as low relative humidity, high service temperature, or both.

A further objective of this invention is to reduce the water to solids ratio and impart greater fluidity of a cement slurry with less total water, thereby reducing the ultimate porosity, increasing strength, and reducing permeability. This is achieved by the addition of urea in concentrations of 1 to 5% by weight, basis dry solids. Urea also reduces the cement's sensitivity to sulfate attack and improves adhesion to concrete and ceramic surfaces though less dramatically than sodium acetate.

A further objective of this invention is to provide an in-situ thixotropic reagent which imparts both a high early viscosity and an early setting or gelling of the cement slurry without consequence to the chemical and mechanical properties otherwise obtained.

Other and further objects, features, and advantages will be apparent in the following description of presently preferred embodiments of the invention, given for the purpose of disclosure.

DESCRIPTION OF THE PREFERRED EMBODIMENTS

The preferred embodiment(s) of the present invention is best described by reference to the following examples.

The following proportions of dry solids are preblended and then mixed uniformly with the prescribed portion of water to provide a dampened, solid mass. The hydrated alkali metal silicate powders are of the spray-dried type as explained in U.S. Pat. No. 4,030,939, and the ranges of operable proportions of all ingredients are set forth as well as the more specific and preferred proportions. Upon standing or continued mixing, the seemingly dry or dampened solids will spontaneously liquefy and achieve a very workable and pourable viscosity. After about 8 hrs at room temperature (about 23° C.), a hard set is obtained (about 400 to 600 psi) which progressively increases to from 4000 to 6000 psi in compressive strength within 24 to 48 hrs as measured by standard ASTM C 109 method. Thereafter, little more than 15% of strength increase is noted unless heat is applied. The tensile strength averages from 10 to about 15% of compressive strength depending upon gradation and type of fillers and the age and history of the specimens. That is, the fineness modulus-gradation and distribution of coarse and fine fillers can enhance or reduce the mechanical properties of the cement mortar.

Upon heating to over 980° C., the product becomes detectably softened as the silica polymer matrix is partially vitrified and fluxed by salt residues in the matrix. When cooled, the product returns to its rigid state, often enhanced in compressive strength and hardness (Mhos scale of 7 to about 8). The cement slurry of this recipe bonds to aged portland cement, brick, tile, metal, glass, etc., so tenaciously that attempts to remove the cement induce cohesive failure within the cement or failure of the substrate. This degree of adhesion is dependent upon a clean, oil-free, and dust-free substrate consistent with good adhesion technology but does not depend upon any prescribed method of application of the mortar. The mortar can be trowelled, dabbed, screeded, gunited, poured or pressed onto the substrate. Good wetting and adhesion is assured in the inherent composition and wetting properties of the slurry, as distinguished from prior art, which does require careful coverage, wetting, and application of the adhesive.

EXAMPLE 1

| | Parts by Weight | |
|---|---|---|
| | Range | Preferred |
| Sand | 0–100 | 35 |
| Silica Flour | 0–100 | 45 |
| Hydrated Sodium Silicate Powder of 2.4/1 Ratio $SiO_2/Na_2O$ | 3–20 | 16 |
| Sodium Silicofluoride | 2–9 | 7 |
| Sodium Acetate, Anhydrous | 1–2 | 1.5 |
| Water | 3–20 | 16 |

Compressive strengths of 5500 to 6500 psi in 3 days and 5 days, respectively, follow a 4500 psi in 24 to 48 hrs with this recipe. Tensile stengths of 550 to 675 psi correspond to 3 and 5 days, respectively.

Example 2 describes a mortar formulation designed to impart a high degree of adhesion to plastic and organic surfaces such as rigid and flexible polyvinyl chloride, styrene butadiene rubber products, and other similar hydrocarbon elastomers, asphaltic concretes, polyethylene and polypropylene. Such a mortar will, however, offer only mechanical adhesion to mineral and metal surfaces compared to physical/chemical bonding as in Example 1. The adhesive bond to rubber and plastic exceeds the tensile strength of the mortar, leaving a uniform coating of unremovable cement on the surface of the organic substrate.

EXAMPLE 2

| | Parts by Weight | |
|---|---|---|
| | Range | Preferred |
| Sand | 0–100 | 35 |
| Silica Flour | 0–100 | 45 |
| Hydrated Sodium Silicate Powder of 2.4/1 Ratio $SiO_2/Na_2O$ | 3–20 | 16 |
| Sodium Silicofluoride | 2–9 | 7 |
| Sodium Tripolyphosphate | 1–3 | 2 |
| Water | 3–20 | 16 |

Compressive strengths of 5500 to 6500 psi in 3 and 5 days, respectively, follow a 4500 psi in 24 to 48 hrs, at about 23° C. while tensile strengths of 550 to 675 psi are typical.

Example 3 offers a mortar of compromising or hybrid adhesive character, providing a measure of organic and inorganic affinity for application to such needs as the bonding of metal to plastic. Each of the three examples, in addition to their unique adhesiveness, provides optimum chemical resistance to sulfate ion attack as well as to other mineral acids, excluding the fluorine-containing acids. They also impart corrosion resistance to steel, aluminum, and zinc metals and alloys, as well as copper and its alloys. There is evidence of tarnishing on the copper/brass surfaces and, of course, the cement bonds tenaciously to the metals and must be sandblasted to remove the residues.

EXAMPLE 3

|  | Parts by Weight | |
|---|---|---|
|  | Range | Preferred |
| Sand | 0–100 | 35 |
| Silica Flour | 0–100 | 45 |
| Hydrated Sodium Silicate Powder of 2.4/1 Ratio SiO$_2$/Na$_2$O | 3–20 | 16 |
| Sodium Silicofluoride | 2–9 | 7 |
| Sodium tripolyphosphate | .5–2 | .75 |
| Sodium Acetate, Anhydrous | .5–2 | .75 |
| Water | 3–20 | 16 |

The mechanical and chemical properties of this mortar closely duplicate those of Examples 1 and 2.

Example 4 provides a sulfate-resistant mortar, adhesive to mineral and metal, which requires 12% less water (basis total water of Examples 1–3) to achieve equal fluidity and to retard evaporation during cure such that thin coatings (⅛ to ¼ in.) may be effectively cured when applied at moderate ambient temperatures and humidities (60° to 90° F. and at 30% relative humidity or higher). At higher temperatures (to 105° F.) and equally low relative humidity, excellent physical, mechanical, and chemical properties are achieved with as little as ⅜ in. thickness or greater. Most aqueous cements will harden and partially cure under these conditions, but their physical, chemical, and mechanical properties are seriously compromised.

EXAMPLE 4

|  | Parts by Weight | |
|---|---|---|
|  | Range | Preferred |
| Sand | 0–100 | 35 |
| Silica Flour | 0–100 | 45 |
| Hydrated Sodium Silicate Powder of 2.4/1 Ratio SiO$_2$/Na$_2$O | 3–20 | 16 |
| Sodium Silicofluoride | 2–9 | 7 |
| Urea | 1–2 | 1.5 |
| Sodium Acetate | 1–2 | 1.5 |
| Water | 3–20 | 14 |

Example 5 provides a mortar which may retain its sulfate ion resistance through a severe thermal cycling exposure without loss of activity. This mortar affords excellent corrosion protection to steel and other metal surfaces, but due to economic limitations is recommended usually for the most severe cyclic services. Variations in service temperature between 0° and 550° C. may occur in chemical and energy production practices with equally wide variance in dew point and chemical environment. To achieve an effective sulfate ion protection, sodium hypophosphite is added, as indicated in the following example.

EXAMPLE 5

|  | Parts by Weight | |
|---|---|---|
|  | Range | Preferred |
| Sand | 0–100 | 35 |
| Silica Flour | 0–100 | 45 |
| Hydrated Sodium Silicate Powder of 2.4/1 Ratio SiO$_2$/Na$_2$O | 3–20 | 16 |
| Sodium Silicofluoride | 2–9 | 7 |
| Sodium Hypophosphite | 1–3 | 2 |

-continued

|  | Parts by Weight | |
|---|---|---|
|  | Range | Preferred |
| Water | 3–20 | 16 |

The addition of sodium hypophosphite does not noticeably alter the physical and mechanical properties of the previous examples.

Examples 6 and 7 are offered as additional options which will reduce sulfate ion attack and enhance mechanical strength slightly but are less effective at equal concentrations than Examples 1–4 in strong and hot sulfuric acid environments.

EXAMPLE 6

|  | Parts by Weight | |
|---|---|---|
|  | Range | Preferred |
| Sand | 0–100 | 35 |
| Silica Flour | 0–100 | 45 |
| Hydrated Sodium Silicate Powder of 2.4/1 Ratio SiO$_2$O/Na$_2$ | 3–20 | 16 |
| Sodium Silicofluoride | 2–9 | 7 |
| Anhydrous Sodium Pyrophosphate | 1–4 | 2 |
| Water | 3–20 | 16 |

EXAMPLE 7

|  | Parts by Weight | |
|---|---|---|
|  | Range | Preferred |
| Sand | 0–100 | 35 |
| Silica Flour | 0–100 | 45 |
| Hydrated Sodium Silicate Powder of 2.4/1 Ratio SiO$_2$/Na$_2$O | 3–20 | 16 |
| Sodium Silicofluoride | 2–9 | 7 |
| Sodium Hexametaphosphate | 1–4 | 3 |
| Water | 3–20 | 16 |

Example 8 provides a mortar having in-situ thixotropic reagent properties which also results in an early gel or set independent of ambient temperatures. This formation contains 0.25 to 2.5 parts by weight of tri-basic magnesium phosphate powder (−200 mesh) as the thixotropic and gelling agent which in the mortar slurry reacts with alkali silicate solution to produce silica gel and magnesium silicate hydrogels which induce a thixotropic property soon after a slurry is formed. Within 10 minutes, the thixotrope begins to increase in viscosity converting to a firm gel within 20 to 30 minutes. The gel subsequently sets to a load-bearing, rigid coating of 100 to 1000 psi compressive strength, depending upon temperature and concentration. This additive may be incorporated with or without the other additives illustrated above in Examples 1–7.

EXAMPLE 8

|  | Parts by Weight | |
|---|---|---|
|  | Range | Preferred |
| Sand | 0–100 | 35 |
| Silica Flour | 0–100 | 45 |
| Hydrated Sodium Silicate Powder of 2.4/1 Ratio SiO$_2$/Na$_2$O | 3–20 | 16 |
| Sodium Silicofluoride | 2–9 | 7 |
| Tribasic Magnesium Phosphate Powder | 0.25–2.5 | 1 |

-continued

|  | Parts by Weight | |
| --- | --- | --- |
|  | Range | Preferred |
| Water | 3–20 | 16 |

What is claimed is:

1. A cement composition comprising:
   (a) a spray-dried hydrated alkali metal silicate powder selected from the group consisting of sodium silicate and potassium silicate having a weight ratio of $SiO_2$/alkali metal oxide in the range of from about 2.4/1 to about 3.22/1;
   (b) a silica polymer-forming agent selected from the group consisting of sodium silicofluoride and potassium silicofluoride; and
   (c) an adhesive agent, sulfate ion inhibitor selected from the group consisting of sodium acetate and urea.

2. The composition of claim 1 including, additionally, a thixotropic agent.

3. The composition of claim 1 including, additionally, a siliceous filler.

4. The composition of claim 1 including, additionally, a fluoride fixation agent.

5. The composition of claim 1 including, additionally, a siliceous filler and a fluoride fixation agent.

6. The composition of claim 1 including, additionally, a siliceous filler, a fluoride fixation agent, and a thixotropic agent.

7. A cement composition consisting essentially of:
   (a) a siliceous filler selected from the group consisting of siliceous sand, silica flour, flyash, and siliceous clay;
   (b) spray-dried hydrated alkali metal silicate powder selected from the group consisting of sodium silicate and potassium silicate having a weight ratio of $SiO_2$/alkali metal oxide in the range of from about 2.4/1 to about 3.22/1;
   (c) an adhesive agent, sulfate ion inhibitor selected from the group consisting of sodium acetate and urea in an amount of 1–5% by weight;
   (d) a silica polymer-forming agent selected from the group consisting of potassium silicofluoride and sodium silicofluoride; and
   (e) water.

8. The cement composition of claim 7 wherein the parts by weight of the mixture are in the ranges of:
   (a) about 0 to about 200 parts filler;
   (b) about 3 to about 20 parts of spray-dried hydrated alkali metal silicate powder;
   (c) about 1 to 5 parts of said adhesive agent per hundred parts of solids;
   (d) about 2 to about 9 parts silica polymerforming agent; and
   (e) about 3 to about 20 parts of water per hundred parts of solids.

9. The cement composition of claim 8 wherein, more particularly, the parts by weight of the mixture include:
   (a) about 80 parts siliceaous filler;
   (b) about 16 parts spray-dried hydrated alkali metal silicate powder;
   (c) about 0.7 to 1.5 parts of said adhesive agent per hundred parts of solids;
   (d) about 7 parts silica polymer-forming agent; and
   (e) about 16 parts of water per hundred parts of solids.

10. The cement composition of claim 7 including, additionally, a fluoride fixation agent.

11. The cement composition of claim 7 including, additionally, glass fiber.

12. A cement composition as defined in claim 1 further including water in the amount of 3–20 percent based on the total weight of said cement composition.

13. The cement composition of claim 12 further including tribasic magnesium phosphate in the amount of 0.25 to 2.5 pph, basis dry solids of said cement composition.

14. A cement composition comprising:
   (a) a spray-dried hydrated alkali metal silicate powder having a weight ratio of $SiO_2$/alkali metal oxide in the range of from about 2.41/1 to about 3.22/1;
   (b) a silica polymer-forming agent selected from the group consisting of sodium silicofluoride and potassium silicofluoride; and
   (c) sodium hypophosphite in an amount of about 1.5 to 2% based on the dry weight of the cement composition.

15. A cement composition as defined in claim 14 further including water in an amount of about 3–20% based on the total weight of said cement composition.

16. A cement composition as defined in claim 14 further including an adhesive agent, sulfate ion inhibitor selected from the group consisting of sodium acetate and urea.

17. A cement composition as defined in claim 16 further including water in an amount of about 3–20% based on the total weight of said cement composition.

18. A cement composition comprising:
   (a) a spray-dried hydrated alkali metal silicate powder having a weight ratio of $SiO_2$/alkali metal oxide in the range of from about 2.4/1 to about 3.22/1;
   (b) a silica polymer-forming agent selected from the group consisting of sodium silicofluoride and potassium silicofluoride; and
   (c) sodium tripolyphosphate in an amount of about 0.5–3% based on the dry weight of said cement composition.

19. A cement composition as defined in claim 18 further including an adhesive agent, sulfate ion inhibitor selected from the group consisting of sodium acetate and urea.

20. A cement composition as defined in claim 19 further including water in the amount f about 3–20% based on the total weight of said cement composition.

21. A cement composition comprising:
   (a) a siliceous filler selected from the group consisting of siliceous sand, silica flour, flyash, and siliceous clay;
   (b) spray-dried hydrated alkali metal silicate powder having a weight ratio of $SiO_2$/alkali metal oxide in the range of from about 2.4/1 to about 3.22/1;
   (c) an adhesive agent, sulfide ion inhibitor selected from the group consisting of sodium acetate and urea in an amount of about 1–5% by weight;
   (d) a silica polymer-forming agent selected from the group consisting of potassium silicofluoride and sodium silicofluoride; and
   (e) water in an amount of about 3–20% based on the total weight of said cement composition.

22. The cement composition of claim 21 including, additionally, from about 1 to about 10 parts by weight of a fluoride fixation agent selected from the group consisting of dibasic calcium phosphate, alumina trihydrate, colemanite, calcium tetraborate pentahydrate and tribasic magnesium phosphate.

23. The cement composition of claim 21 including, additionally, from about 0.25 to 2.5 parts by weight of tribasic magnesium phosphate as thixotropic agent and gelling agent.

24. A method of obtaining improved adherence of a cement composition to a material selected from the group consisting of minerals and metals comprising:
forming a cement composition comprising:
(a) a spray-dried hydrated alkali metal silicate powder having a weight ratio of $SiO_2$/alkali metal oxide in the range of from about 2.4/1 to about 3.22/1;
(b) a silica polymer-forming agent selected from the group consisting of sodium silicofluoride and potassium silicofluoride;
(c) an adhesive agent, sulfate ion inhibitor selected from the group consisting of sodium acetate, urea; sodium hypophosphite and mixtures thereof; and
(d) water;
contacting said cement composition with said mineral or metal material; and
drying said cement composition while in contact with said material to tenaciously bond said cement composition to said material.

25. A method of obtaining improved adherence of a cement composition to a material selected from the group consisting of plastic, rubber and bitumen comprising:
forming a cement composition comprising
(a) a spray-dried hydrated alkali silicate metal powder having a weight ratio of $SiO_2$/alkali metal oxide in the range of from about 2.4/1 to about 3.22/1;
(b) a silica polymer-forming agent selected from the group consisting of sodium silicofluoride and potassium silicofluoride;
(c) sodium tripolyphosphate; and
(d) water;
contacting said cement composition with said plastic, rubber or bitumen material; and
drying said cement composition while in contact with said material to tenaciously bond said cement composition to said material.

* * * * *